US010306148B2

(12) United States Patent
Mäkelä et al.

(10) Patent No.: US 10,306,148 B2
(45) Date of Patent: May 28, 2019

(54) MOTION TRIGGERED GATED IMAGING (71) Applicant: Microsoft Technology Licensing, LLC, Redmond, WA (US)

(72) Inventors: Christian Mäkelä, Tampere (FI); Ossi Pirinen, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 69 days.

(21) Appl. No.: 15/252,194

(22) Filed: Aug. 30, 2016

(65) Prior Publication Data
US 2018/0063442 A1  Mar. 1, 2018

(51) Int. Cl.
*H04N 5/235* (2006.01)
*H04N 5/232* (2006.01)

(52) U.S. Cl.
CPC ....... *H04N 5/23287* (2013.01); *H04N 5/2327* (2013.01); *H04N 5/2355* (2013.01); *H04N 5/2356* (2013.01); *H04N 5/23277* (2013.01)

(58) Field of Classification Search
CPC ............. H04N 5/23287; H04N 5/2327; H04N 5/23277; H04N 5/2355; H04N 5/2356
See application file for complete search history.

(56) References Cited

U.S. PATENT DOCUMENTS

| 6,343,187 B1 * | 1/2002 | Sato | G03B 17/40 |
| | | | 396/52 |
| 7,796,872 B2 | 9/2010 | Sachs et al. | |
| 8,009,971 B2 | 8/2011 | Koo et al. | |
| 8,139,885 B2 | 3/2012 | Hsu | |
| 8,170,408 B2 | 5/2012 | Nasiri et al. | |
| 8,493,454 B1 | 7/2013 | Kohn et al. | |
| 8,711,230 B2 | 4/2014 | Matsunaga | |
| 8,786,715 B2 | 7/2014 | Lee | |
| 2004/0160525 A1 * | 8/2004 | Kingetsu | H04N 5/23248 |
| | | | 348/364 |
| 2005/0057662 A1 * | 3/2005 | Washisu | H04N 5/2253 |
| | | | 348/208.99 |
| 2005/0248660 A1 * | 11/2005 | Stavely | G03B 39/00 |
| | | | 348/208.16 |

(Continued)

FOREIGN PATENT DOCUMENTS

CN    204119344 U    1/2015
WO    2015198300 A1    12/2015

OTHER PUBLICATIONS

"International Search Report and Written Opinion Issued in PCT Application No. PCT/US2017/026876", dated Dec. 14, 2017, 11 Pages.

(Continued)

*Primary Examiner* — Abdelaaziz Tissire

(57) ABSTRACT

In one example, a digital image capture unit comprises a gated image sensor configured to operate multiple sensor exposure events per a single image frame readout. The digital image capture unit further comprises a motion monitor configured to monitor motion related to the digital image capture unit. The digital image capture unit further comprises a controller configured to instruct the gated image sensor to discard a sensor exposure event of the multiple sensor exposure events in response to a temporally corresponding monitored motion related to the digital image capture unit failing to meet a motion requirement.

20 Claims, 6 Drawing Sheets

210

220

(56) References Cited

U.S. PATENT DOCUMENTS

| | | | |
|---|---|---|---|
| 2006/0072912 A1* | 4/2006 | Momochi | G03B 5/00 396/55 |
| 2006/0187324 A1* | 8/2006 | Lin | H04N 5/23248 348/241 |
| 2007/0097221 A1* | 5/2007 | Stavely | H04N 5/23248 348/208.11 |
| 2007/0237514 A1* | 10/2007 | Pillman | G03B 7/00 396/153 |
| 2008/0037970 A1* | 2/2008 | Saito | G03B 5/00 396/55 |
| 2009/0141133 A1* | 6/2009 | Watanabe | H04N 5/23248 348/208.6 |
| 2009/0153679 A1 | 6/2009 | Nagata et al. | |
| 2010/0098394 A1 | 4/2010 | Ishihara et al. | |
| 2010/0295953 A1 | 11/2010 | Torii et al. | |
| 2011/0134259 A1* | 6/2011 | Kim | H04N 5/23248 348/208.4 |
| 2011/0157381 A1 | 6/2011 | Miyasako | |
| 2012/0105656 A1* | 5/2012 | Noguchi | H04N 5/23245 348/208.4 |
| 2012/0120263 A1* | 5/2012 | Li | H04N 5/23258 348/208.4 |
| 2013/0063615 A1* | 3/2013 | Takeuchi | H04N 5/23258 348/208.5 |
| 2014/0049658 A1 | 2/2014 | Yamazaki | |
| 2014/0362256 A1 | 12/2014 | Schulze et al. | |
| 2015/0139634 A1 | 5/2015 | Kim | |
| 2015/0195457 A1 | 7/2015 | Kim et al. | |
| 2015/0195461 A1* | 7/2015 | Kang | H04N 5/23287 348/208.2 |
| 2017/0115395 A1* | 4/2017 | Grauer | G01S 7/4865 |
| 2017/0155844 A1* | 6/2017 | Iso | H04N 5/345 |

OTHER PUBLICATIONS

Moon, et al., "Implementation of an Image Stabilization System for a Small Digital Camera", In Proceedings of IEEE Transactions on Consumer Electronics, vol. 54, Issue 2, May 2008, pp. 206-212.

* cited by examiner

MOTION TRIGGERED GATED IMAGING

BACKGROUND

Digital cameras may need extended exposure times e.g. in low light conditions. Extended exposure times are prone to camera movement, such as hand-shaking motion. This camera movement can be partially compensated for by an optical image stabilization system. In some instances, the camera movement compensation by the optical image stabilization system may have limitations which make capturing sharp, well-exposed images with a hand-held device in low light conditions difficult or even impossible.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one example, a digital image capture unit comprises a gated image sensor configured to operate multiple sensor exposure events per a single image frame readout. The digital image capture unit further comprises a motion monitor configured to monitor motion related to the digital image capture unit. The digital image capture unit further comprises a controller configured to instruct the gated image sensor to discard a sensor exposure event of the multiple sensor exposure events in response to a temporally corresponding monitored motion related to the digital image capture unit failing to meet a motion requirement.

In another example, a method and an electronic apparatus have been discussed along with the features of the digital image capture unit.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of operations for constructing and operating the example. However, the same or equivalent functions and sequences may be accomplished by different examples.

At least some of the disclosed examples may allow motion triggered gated imaging, for example to enhance image stabilization used in digital cameras. Accordingly, at least some of the disclosed examples may allow capturing sharp and well-exposed images with a hand-held digital camera even in low light conditions. At least some of the disclosed examples may allow eliminating or at least decreasing blur originating from non-ideal OIS compensation from the final image due to combining information from the gyroscopes and the Hall effect sensors with storage/reset capability of a gated imaging sensor thereby enabling the use of image signal fragments in final image formation for which the OIS is able to compensate either fully or to an agreeable extent the motion of the digital image capture unit. At least some of the disclosed examples may allow capturing sharp and well-exposed images with a hand-held digital camera for both video and still images.

Figure 1A:
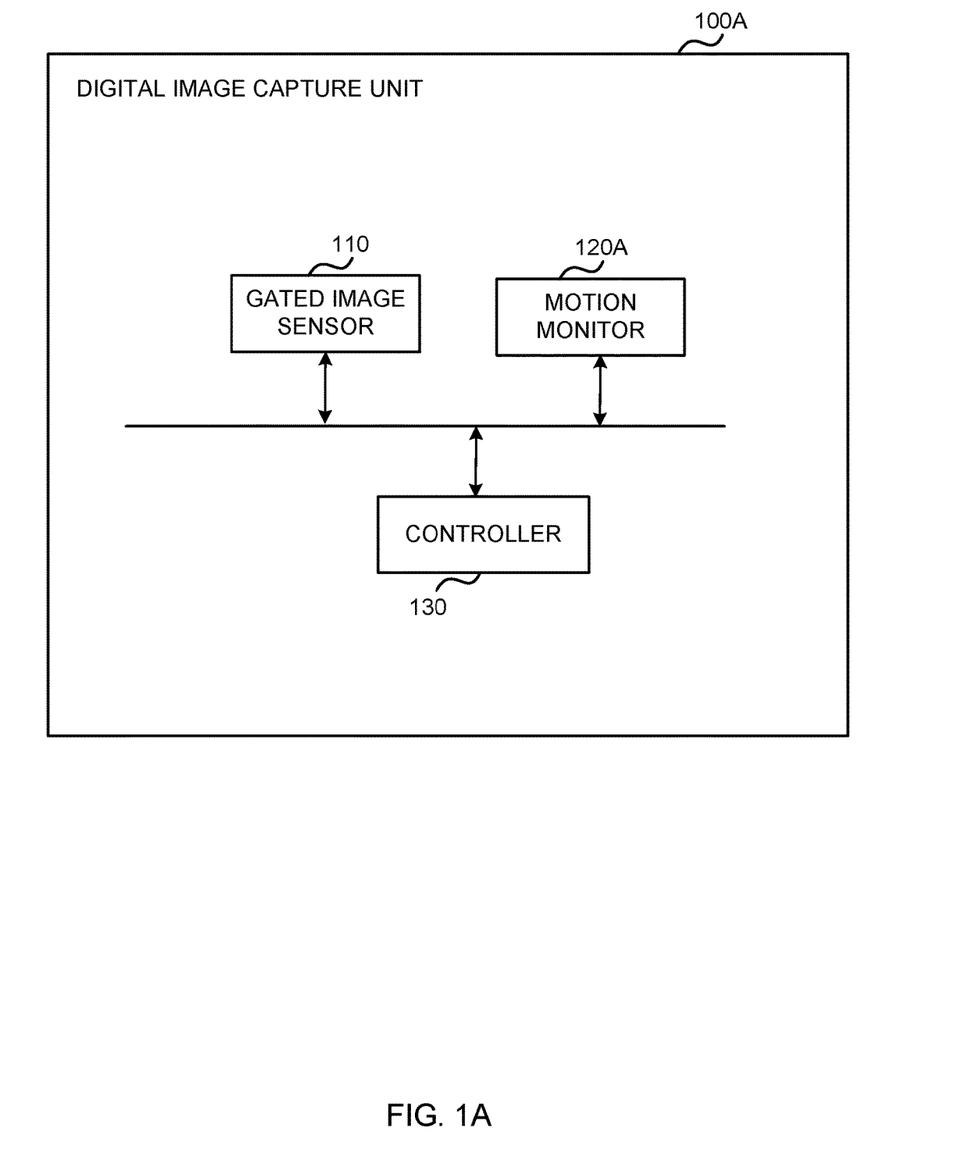
FIG. 1A is an example block diagram of a digital image capture unit in accordance with an example embodiment.

FIG. 1A is an example block diagram of a digital image capture unit 100A in accordance with an example embodiment. The digital image capture unit 100A may be employed, for example, in the electronic apparatus 400 of FIG. 4. However, it should be noted that the digital image capture unit 100A may also be employed on a variety of other devices and apparatuses, and therefore, embodiments should not be limited to application on devices and apparatuses such as the electronic apparatus 400 of FIG. 4. Furthermore, it should be noted that at least some of the elements described below may not be mandatory and thus some may be omitted in certain embodiments. The digital image capture unit 100A may be included e.g. in a stand-alone digital camera or an integrated digital camera which may be still cameras and/or video cameras, and the like.

The digital image capture unit 100A comprises a gated image sensor 110 that is configured to operate (e.g. store and/or discard) multiple sensor exposure events per a single image frame readout. The gated image sensor may be further configured to operate in a global shutter mode in which case the sensor exposure events are global sensor exposure events. In an example, the duration of the single image frame readout may be 30 milliseconds (ms). The duration of each sensor exposure event is a fragment of the duration of the single image frame readout, for example in the range of microseconds or nanoseconds.

In the global shutter mode, an entire image frame is captured at the same instant. This is in contrast to e.g. rolling shutter mode in which different parts (e.g. pixel rows) of an image frame are captured at slightly different times, for example one row after another.

The gated image sensor 110 may include e.g. a charge-coupled device (CCD) sensor or a complementary metal-oxide-semiconductor (CMOS) sensor. A gated CMOS image sensor is also known as GCMOS. One single frame is typically composed from repeating global exposures events. A GCMOS may be manufactured using e.g. contact image sensor (CIS) technology on near-infrared (NIR) global shutter platform.

Figure 2A:
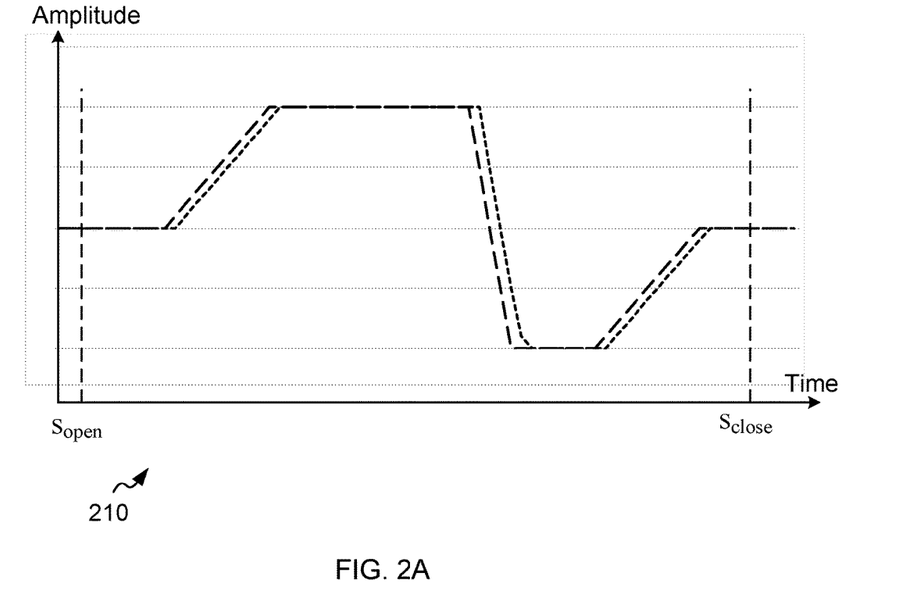
FIGS. 2A-2B illustrate thresholds in accordance with an example embodiment.
Figure 2B:
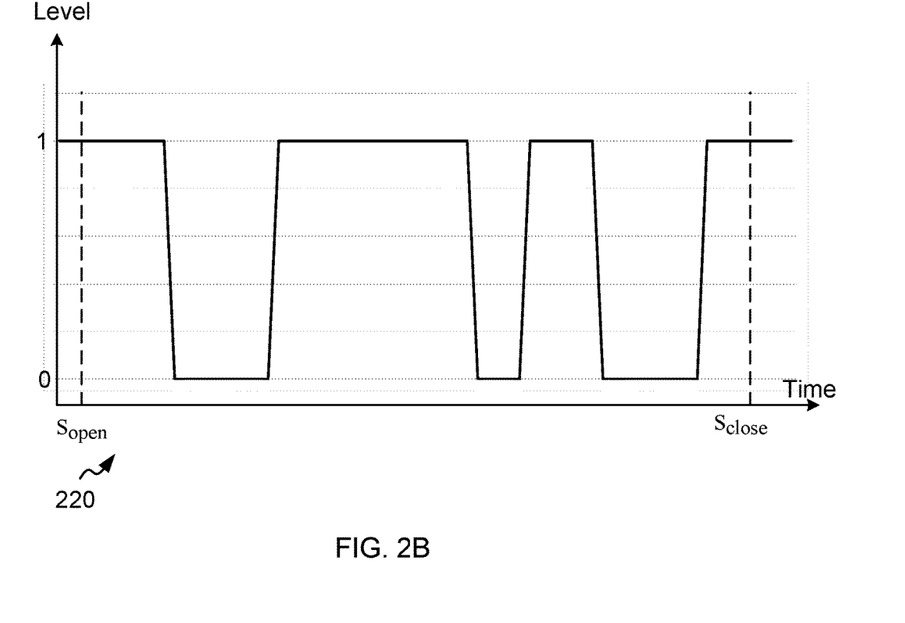

Herein, the term "image frame readout" refers to an event that starts with the shutter opening (or the image frame light accumulation beginning, in the case of an electronic shutter) and ends with the shutter closing (or the image frame light accumulation finishing, in the case of an electronic shutter), with no other shutter actuation in-between. As discussed above, a single "image frame readout" may contain multiple exposure events. In other words, "image frame readout" is the period needed for accumulating or integrating light for an entire single image frame, and an exposure event is a temporal segment or subset of this light accumulation period. This is also illustrated in FIGS. 2A-2B in which $s_{open}$ represents the instant of the shutter opening and $s_{close}$ represents the instant of the shutter closing. These multiple exposure events are controlled or operated with the gating functionality (comprising e.g. one or more logical switches or gates) of the gated image sensor (rather than shutter functionality) by gating the charge generated in the photodiode(s) to either a storage node or to a reset (i.e. ground) node.

The digital image capture unit 100A further comprises a motion monitor 120A that is configured to monitor motion related to the digital image capture unit 100A. The motion related to the digital image capture unit may comprise e.g. motion of an object in a scene to be captured during the image frame readout. Alternatively, the motion related to the digital image capture unit may comprise motion of the digital image capture unit, as discussed in more detail with reference to FIG. 1B.

The digital image capture unit 100A further comprises a controller 130 that is configured to instruct the gated image sensor 110 to discard a sensor exposure event of the multiple sensor exposure events in response to a temporally corresponding monitored motion related to the digital image capture unit 100A failing to meet a motion requirement. Here, "temporally corresponding" indicates that a given monitored motion occurs at the same instant as its corresponding sensor exposure event, as also illustrated e.g. in FIGS. 2A-2B. As discussed above, the duration of each sensor exposure event is a fragment of the duration of the single image frame readout, for example in the range of microseconds or nanoseconds.

Figure 1B:
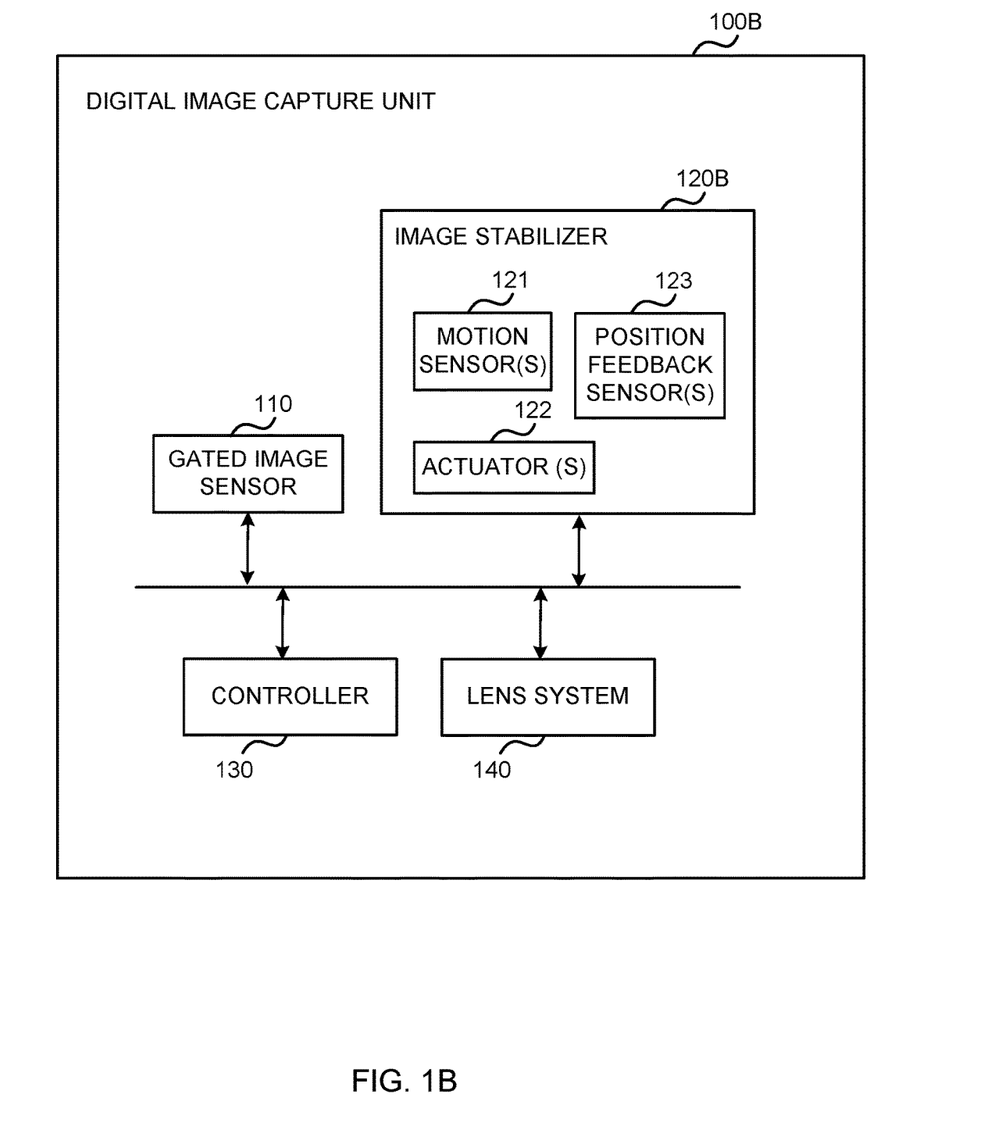
FIG. 1B is an example block diagram of a digital image capture unit in accordance with another example embodiment.

FIG. 1B is an example block diagram of a digital image capture unit 100B in accordance with an example embodiment. The digital image capture unit 100B may be employed, for example, in the electronic apparatus 400 of FIG. 4. However, it should be noted that the digital image capture unit 100B may also be employed on a variety of other devices and apparatuses, and therefore, embodiments should not be limited to application on devices and apparatuses such as the electronic apparatus 400 of FIG. 4. Furthermore, it should be noted that at least some of the elements described below may not be mandatory and thus some may be omitted in certain embodiments. The digital image capture unit 100B may be included e.g. in a stand-alone digital camera or an integrated digital camera which may be still cameras and/or video cameras, and the like.

In the example of FIG. 1B, the functionalities and properties of the gated image sensor 110 and the controller 130 are substantially similar to those of their counterparts in the example of FIG. 1A, so their descriptions are not repeated here in detail.

The digital image capture unit 100B further comprises an image stabilizer 120B (e.g. an optical image stabilizer or OIS) that is configured to stabilize image frames by compensating for the monitored motion of the digital image capture unit.

The image stabilizer 120B comprises one or more motion sensors 121 that are configured to detect the motion of the digital image capture unit 100B. At least one of the motion sensors may comprise a gyroscope. The motion of the digital image capture unit 100B may comprise e.g. pitch, yaw and/or roll of the digital image capture unit 100B. The motion of the digital image capture unit 100B may be caused e.g. by hand shaking of a user operating the digital image capture unit 100B.

The digital image capture unit 100B further comprises a lens system 140. The image stabilizer 120B further comprises one or more actuators 122 that are configured to shift either the gated image sensor 110 or the lens system 140 in order to compensate for the detected motion of the digital image capture unit 100B. The image stabilizer 120B further comprises one or more position feedback sensors 123 that are configured to measure the movement of the shifted gated image sensor 110 or lens system 140. At least one of the position feedback sensors may comprise a Hall effect sensor.

In the embodiment of FIG. 1B, the motion requirement may comprise the difference between the detected motion of the digital image capture unit 100B and the measured movement of the shifted gated image sensor 110 or lens system 140 staying below a threshold. Accordingly, the failure to meet the motion requirement may comprise e.g. the difference between the detected motion of the digital image capture unit 100B and the measured movement of the shifted gated image sensor 110 or lens system 140 failing to stay below a threshold. FIGS. 2A-2B illustrate thresholds in such a case. In FIG. 2A, the dashed line represents a gyroscope signal, and the dotted line represents a Hall effect sensor signal. As can be seen in FIG. 2A, there are temporal segments when the Hall effect sensor(s) 123 lag behind the motion of the digital image capture unit 100B detected by gyroscope(s) 121. This lag may be due to e.g. processing logic. In this example, for these segments the difference between the detected motion of the digital image capture unit 100B and the measured movement of the shifted gated image sensor 110 or lens system 140 is considered to exceed the threshold. FIG. 2B illustrates how these temporal segments with lag are discarded by setting a control value to zero, thereby ruling them out of exposure accumulation of the gated image sensor 110. For temporal segments without lag, the control value may be set one, thereby enabling their use in image signal integration of the gated image sensor 110.

The threshold may be increased over time during the image frame readout. This results in the likelihood of sensor exposure events being discarded decreasing over time, thereby lessening or removing the risk of having no non-discarded sensor exposure events at all for the duration of the image frame readout. Alternatively, it may be determined that at least for a given portion of the duration of the image frame readout (e.g. 10 ms out of 30 ms) sensor exposure events must not be discarded to avoid having no non-discarded sensor exposure events at all for the duration of the image frame readout.

The controller 130 may comprise an image stabilizer driver, such as an OIS driver. The image stabilizer driver may be included in an integrated circuit.

Figure 3A:
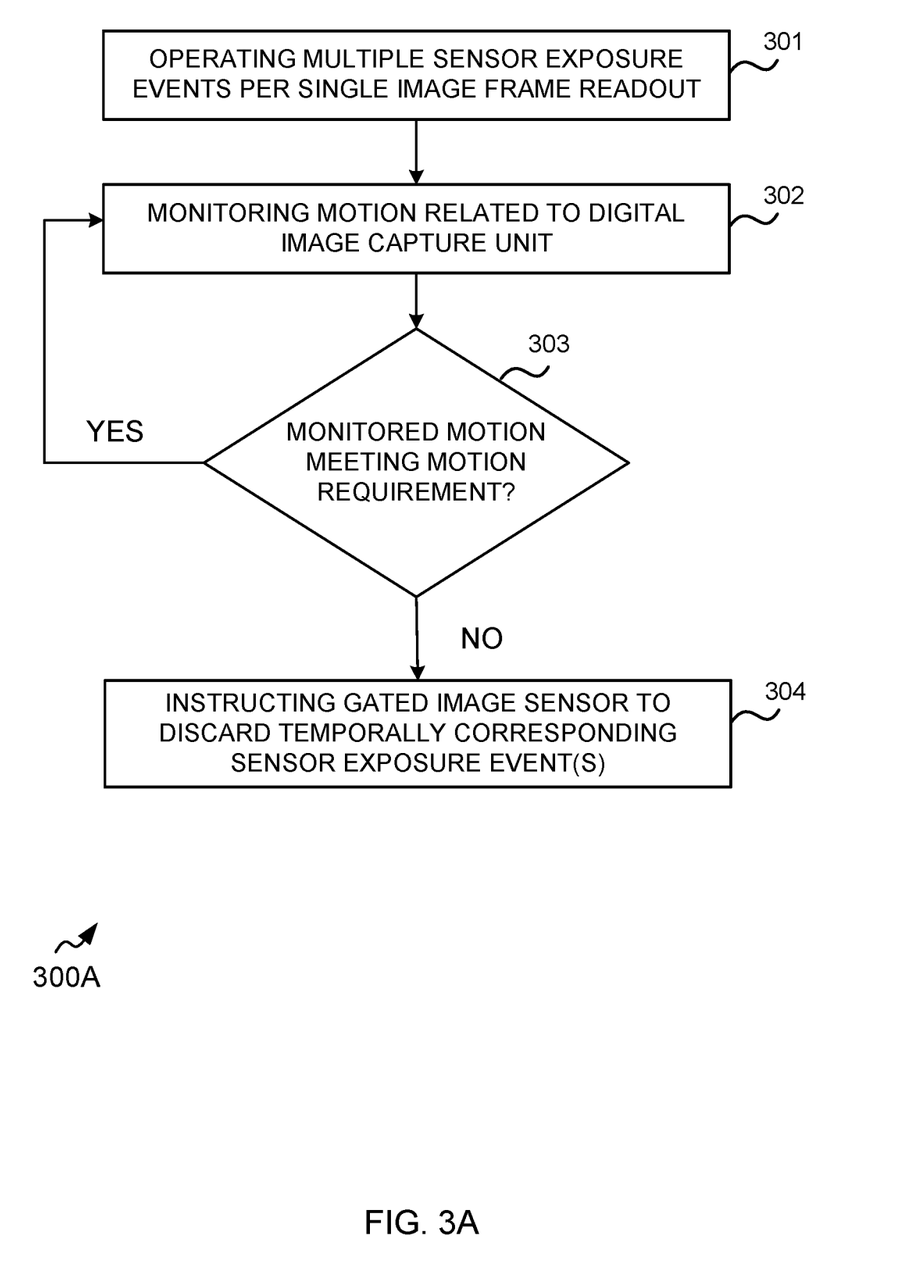
FIG. 3A-3B are example flow diagrams of methods in accordance with example embodiments.

FIG. 3A is an example flow diagram of a method 300A in accordance with an example embodiment. At operation 301, multiple sensor exposure events per a single image frame readout are operated by a gated image sensor of a digital image capture unit.

At operation 302, motion related to the digital image capture unit is monitored by a motion monitor of the digital image capture unit. The motion related to the digital image capture unit may comprise e.g. motion of an object in a scene to be captured during the image frame readout. Alternatively, the motion related to the digital image capture unit may comprise motion of the digital image capture unit, as discussed in more detail with reference to FIG. 3B.

At operation 303, it is determined whether a monitored motion related to the digital image capture unit meets a motion requirement. If yes, the method returns to operation 302. Otherwise, the method proceeds to operation 304.

At operation 304, a controller of the digital image capture unit instructs the gated image sensor to discard a temporally corresponding sensor exposure event of the multiple sensor exposure events. The non-discarded exposure events may then be used in accumulating the final or actual image signal.

Figure 3B:
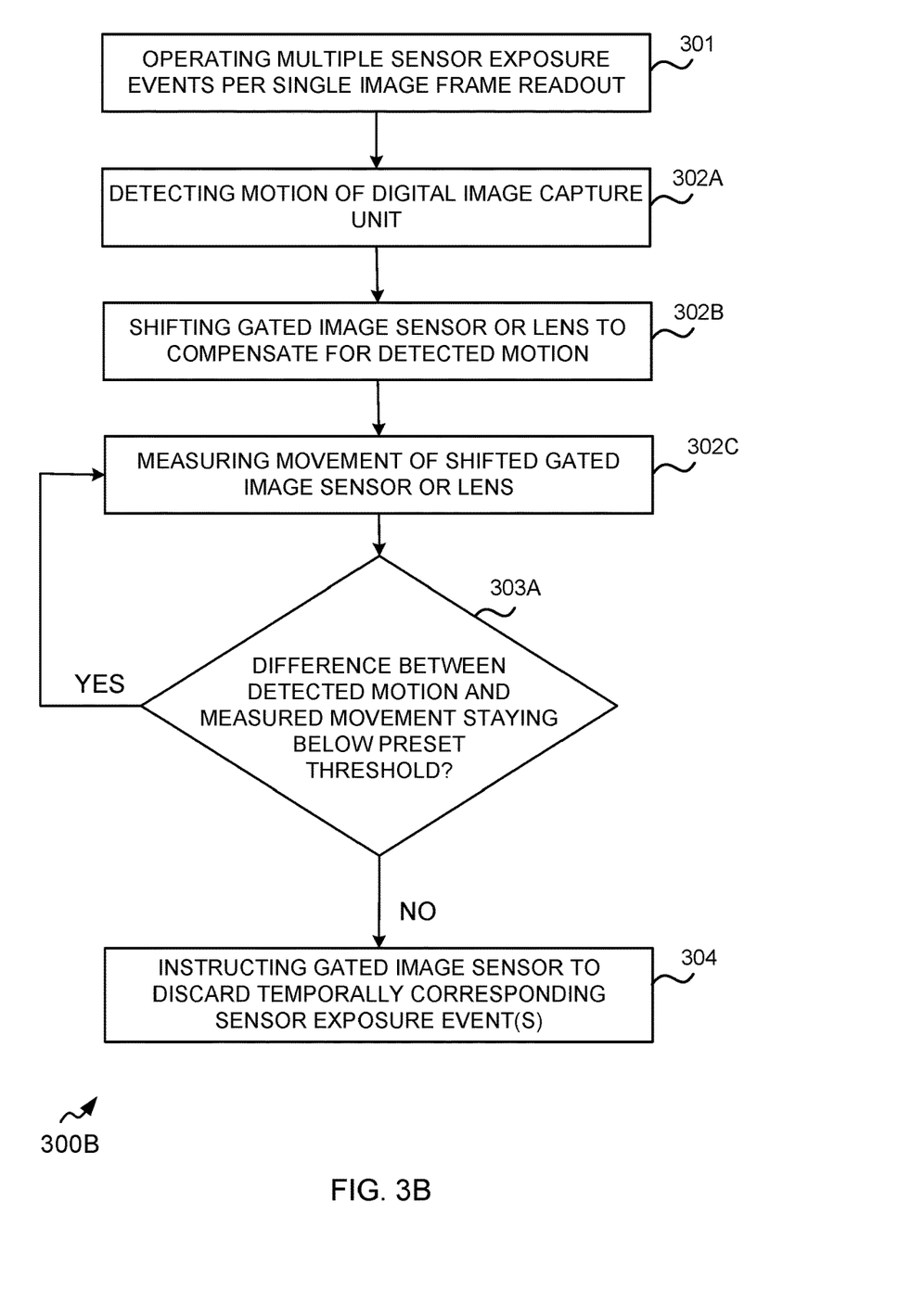

FIG. 3B is an example flow diagram of a method 300B in accordance with an example embodiment. At operation 301, multiple sensor exposure events per a single image frame readout are operated by a gated image sensor of a digital image capture unit.

In the example of FIG. 3B, motion of the digital image capture unit is monitored, e.g. in order to stabilize image frames by compensating for the monitored motion of the digital image capture unit. Accordingly, at operation 302A, motion of the digital image capture unit is detected by at least one motion sensor of the digital image capture unit.

At operation 302B, the gated image sensor or a lens system of the digital image capture unit is shifted by at least one actuator of the digital image capture unit in order to compensate for the detected motion of the digital image capture unit.

At operation 302C, the compensating movement of the shifted gated image sensor or lens system caused by the actuator(s) is measured by at least one position feedback sensor of the digital image capture unit.

At operation 303A, it is determined whether the difference between the detected motion of the digital image capture unit and the measured movement of the shifted gated image sensor or lens system stays below a threshold. If yes, the method returns to operation 302C. Otherwise, the method proceeds to operation 304. The threshold may be increased over time during the image frame readout.

At operation 304, a controller of the digital image capture unit instructs the gated image sensor to discard a temporally corresponding sensor exposure event of the multiple sensor exposure events. The non-discarded exposure events may then be used in accumulating the final or actual image signal.

Operation 301 may be performed e.g. by the gated image sensor 110 of FIGS. 1A-1B. Operation 302 may be performed e.g. by the motion monitor 120A of FIG. 1A. Operations 302A-302C may be performed e.g. by the image stabilizer 120B of FIG. 1B. More particularly, operation 302A may be performed e.g. by the motion sensor 121 of FIG. 1B, operation 302B may be performed e.g. by the actuator 122 of FIG. 1B, and operation 302C may be performed e.g. by the position feedback sensor 123 of FIG. 1B. Operations 303, 303A and 304 may be performed e.g. by the controller 130 of FIGS. 1A-1B.

A gated imaging sensor is a sensor that is capable of gating the charge generated in its photodiode to either a storage node or to a reset (i.e. ground) node at very fast intervals. This allows for precise control over which parts of the signal are used to accumulate the actual image signal and which parts are omitted. At least in some of the examples disclosed in FIGS. 1-3B, by combining the information from the gyroscopes and the Hall effect sensors with the storage/reset capability of a gated imaging sensor it is possible to only use in final image formation image signal fragments where the OIS is able to compensate either fully or to an agreeable extent the motion of the digital image capture unit. This eliminates blur originating from non-ideal OIS compensation from the final image, resulting in a sharper capture.

Figure 4:
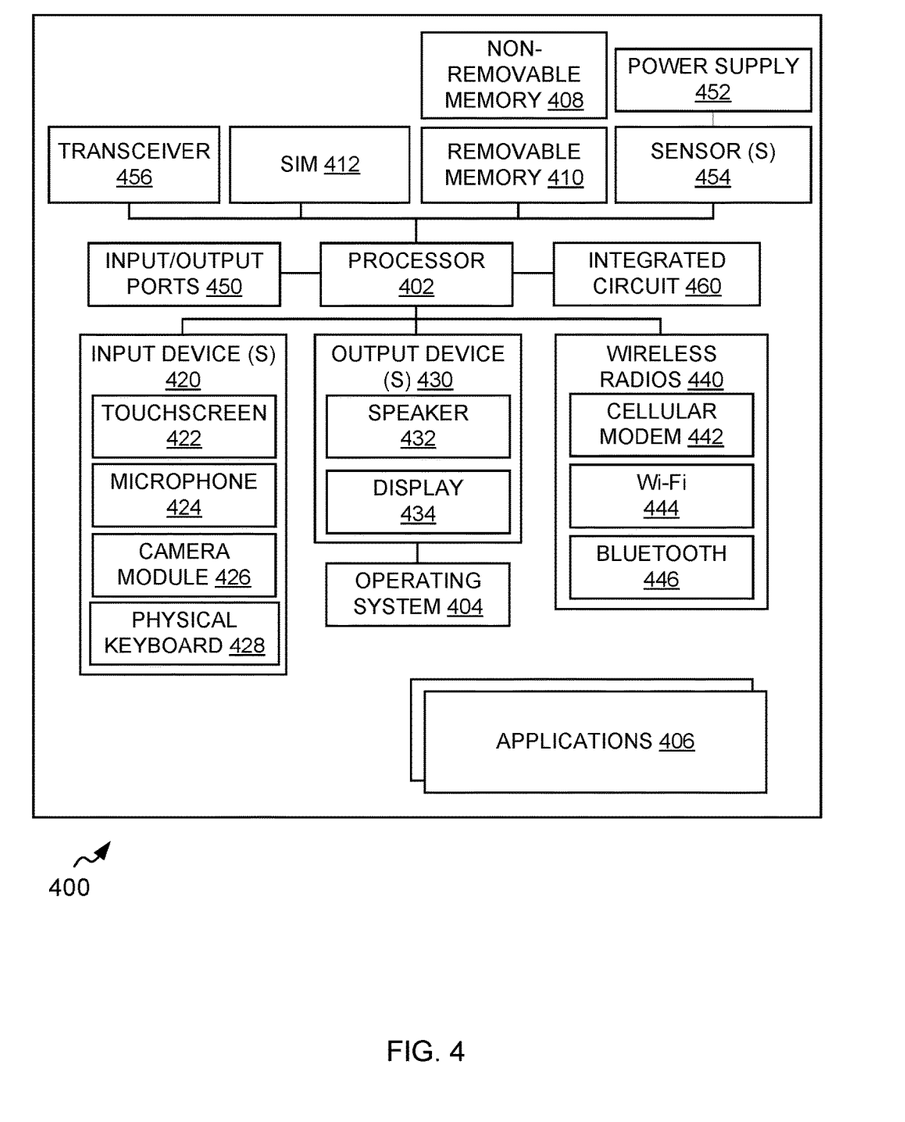
FIG. 4 illustrates an example block diagram of an electronic apparatus capable of implementing example embodiments described herein.

FIG. 4 is a schematic block diagram of an electronic apparatus 400 capable of implementing embodiments of the techniques described herein. It should be understood that the electronic apparatus 400 as illustrated and hereinafter described is merely illustrative of one type of apparatus or an electronic device and should not be taken to limit the scope of the embodiments. As such, it should be appreciated that at least some of the components described below in connection with the electronic apparatus 400 may be optional and thus in an example embodiment may include more, less or different components than those described in connection with the example embodiment of FIG. 4. As such, among other examples, the electronic apparatus 400 could be any of apparatuses incorporating a digital image capture unit. For example, the device 400 may be implemented as a smart phone, tablet computer, laptop computer, laptop/tablet hybrid, stand-alone digital (still and/or video) camera or the like.

The illustrated electronic apparatus 400 includes a controller or a processor 402 (i.e. a signal processor, microprocessor, ASIC, or other control and processing logic circuitry) for performing such tasks as signal coding, data processing, input/output processing, power control, and/or other functions. An operating system 404 controls the allocation and usage of the components of the electronic apparatus 400 and support for one or more application programs 406. The application programs 406 can include common mobile applications, for instance, telephony applications, email applications, calendars, contact managers, web browsers, messaging applications, or any other application.

The illustrated electronic apparatus 400 includes one or more memory components, for example, a non-removable memory 408 and/or removable memory 410. The non-removable memory 408 may include RAM, ROM, flash memory, a hard disk, or other well-known memory storage technologies. The removable memory 410 may include flash memory or smart cards. The one or more memory components may be used for storing data and/or code for running the operating system 404 and the applications 406. Example of data may include web pages, text, images, sound files, image data, video data, or other data sets to be sent to and/or received from one or more network servers or other devices via one or more wired or wireless networks. The electronic device 400 may further include a subscriber identity module (SIM) 412. The SIM 412 typically stores information elements related to a mobile subscriber. A SIM is well known in Global System for Mobile Communications (GSM) communication systems, Code Division Multiple Access (CDMA) systems, or with third-generation (3G) wireless communication protocols such as Universal Mobile Telecommunications System (UMTS), CDMA1000, wideband CDMA (WCDMA) and time division-synchronous CDMA (TD-SCDMA), or with fourth-generation (4G) wireless communication protocols such as LTE (Long-Term Evolution). The SIM 412 may comprise a virtual SIM. Furthermore, multiple SIMs may be utilized.

The electronic apparatus 400 can support one or more input devices 420 and one or more output devices 430. Examples of the input devices 420 may include, but are not limited to, a touchscreen 422 (i.e., capable of capturing finger tap inputs, finger gesture inputs, multi-finger tap inputs, multi-finger gesture inputs, or keystroke inputs from a virtual keyboard or keypad), a microphone 424 (i.e., capable of capturing voice input), a camera module 426 (i.e., capable of capturing still picture images and/or video images) and a physical keyboard 428. The camera module 426 may include the digital image capture unit 100A, 100B of FIGS. 1A-1B. Examples of the output devices 430 may include, but are not limited to a speaker 432 and a display 434. Other possible output devices (not shown) can include piezoelectric or other haptic output devices. Some devices can serve more than one input/output function. For example, the touchscreen 422 and the display 434 can be combined into a single input/output device.

In an embodiment, the electronic device 400 may comprise a wireless radio(s) 440. The wireless radio(s) 440 can support two-way communications between the processor 402 and external devices, as is well understood in the art. The wireless radio(s) 440 are shown generically and can include, for example, a cellular modem 442 for communicating at long range with the mobile communication network, a Wi-Fi radio 444 for communicating at short range with a local wireless data network or router, and/or a BLUETOOTH radio 446. The cellular modem 442 is typically configured for communication with one or more cellular networks, such as a GSM/3G/4G network for data and voice communications within a single cellular network, between cellular networks, or between the mobile device and a public switched telephone network (PSTN).

The electronic device 400 can further include one or more input/output ports 450, a power supply 452, one or more sensors 454, for example an accelerometer, a gyroscope, a compass, or an infrared proximity sensor for detecting the orientation or motion of the electronic device 400, and a transceiver 456 (for wirelessly transmitting analog or digital signals), and an integrated circuit 460. The illustrated components are not required or all-inclusive, as any of the components shown can be deleted and other components can be added. The integrated circuit 460 may include the controller 130 of FIGS. 1A-1B.

Computer executable instructions may be provided using any computer-readable media that is accessible by computing based devices. Computer-readable media may include, for example, computer storage media such as memory and communications media. Computer storage media, such as memory includes volatile and non-volatile, removable and non-removable media implemented in any method or technology for storage of information such as computer readable instructions, data structures, program modules or the like. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media is shown within the computing based devices it will be appreciated that the storage may be distributed or located remotely and accessed via a network or other communication link, for example by using a communication interface.

At least some of the examples disclosed in FIGS. 1-4 are able to provide motion triggered gated imaging, for example to enhance image stabilization used in digital cameras. At least some of the examples disclosed in FIGS. 1-4 are able to provide capturing sharp and well-exposed images with a hand-held digital camera even in low light conditions.

An embodiment of a digital image capture unit comprises a gated image sensor configured to operate multiple sensor exposure events per a single image frame readout; a motion monitor configured to monitor motion related to the digital image capture unit; and a controller configured to instruct the gated image sensor to discard a sensor exposure event of the multiple sensor exposure events in response to a temporally corresponding monitored motion related to the digital image capture unit failing to meet a motion requirement.

In an embodiment, alternatively or in addition to the above described embodiments, the motion related to the digital image capture unit comprises motion of an object in a scene to be captured during the image frame readout.

In an embodiment, alternatively or in addition to the above described embodiments, the motion related to the digital image capture unit comprises motion of the digital image capture unit.

In an embodiment, alternatively or in addition to the above described embodiments, the motion monitor comprises an image stabilizer configured to stabilize image frames by compensating for the monitored motion of the digital image capture unit.

In an embodiment, alternatively or in addition to the above described embodiments, the image stabilizer comprises at least one motion sensor configured to detect the motion of the digital image capture unit.

In an embodiment, alternatively or in addition to the above described embodiments, at least one motion sensor comprises a gyroscope.

In an embodiment, alternatively or in addition to the above described embodiments, the digital image capture unit further comprises a lens system, and the image stabilizer further comprises at least one actuator configured to shift one of the gated image sensor and the lens system in order to compensate for the detected motion of the digital image capture unit; and at least one position feedback sensor configured to measure the movement of the shifted one of the gated image sensor and the lens system.

In an embodiment, alternatively or in addition to the above described embodiments, at least one position feedback sensor comprises a Hall effect sensor.

In an embodiment, alternatively or in addition to the above described embodiments, the motion requirement comprises the difference between the detected motion of the digital image capture unit and the measured movement of the shifted one of the gated image sensor and the lens system staying below a threshold.

In an embodiment, alternatively or in addition to the above described embodiments, the threshold is increased over time during the image frame readout.

In an embodiment, alternatively or in addition to the above described embodiments, the controller comprises an image stabilizer driver.

In an embodiment, alternatively or in addition to the above described embodiments, the gated image sensor is further configured to operate in a global shutter mode.

An embodiment of a method comprises operating, by a gated image sensor of a digital image capture unit, multiple sensor exposure events per a single image frame readout; monitoring, by a motion monitor of the digital image capture unit, motion related to the digital image capture unit; and instructing, by a controller of the digital image capture unit, the gated image sensor to discard a sensor exposure event of the multiple sensor exposure events in response to a temporally corresponding monitored motion related to the digital image capture unit failing to meet a motion requirement.

In an embodiment, alternatively or in addition to the above described embodiments, the motion related to the digital image capture unit comprises motion of an object in a scene to be captured during the image frame readout.

In an embodiment, alternatively or in addition to the above described embodiments, the motion related to the digital image capture unit comprises motion of the digital image capture unit, and the method further comprises stabilizing image frames by compensating for the monitored motion of the digital image capture unit.

In an embodiment, alternatively or in addition to the above described embodiments, the stabilizing of the image frames comprises detecting, by at least one motion sensor of the digital image capture unit, motion of the digital image capture unit.

In an embodiment, alternatively or in addition to the above described embodiments, the stabilizing of the image frames further comprises shifting, by at least one actuator of the digital image capture unit, one of the gated image sensor and a lens system of the digital image capture unit in order to compensate for the detected motion of the digital image capture unit; and measuring, by at least one position feedback sensor of the digital image capture unit, the movement of the shifted one of the gated image sensor and the lens system.

In an embodiment, alternatively or in addition to the above described embodiments, the motion requirement comprises the difference between the detected motion of the digital image capture unit and the measured movement of the shifted one of the gated image sensor and the lens system staying below a threshold.

In an embodiment, alternatively or in addition to the above described embodiments, the method further comprises increasing the threshold over time during the image frame readout.

An embodiment of an electronic apparatus comprises a digital image capture unit comprising a gated image sensor configured to operate multiple sensor exposure events per a single image frame readout; a motion monitor configured to monitor motion related to the digital image capture unit; and a controller configured to instruct the gated image sensor to discard a sensor exposure event of the multiple sensor exposure events in response to a temporally corresponding monitored motion related to the digital image capture unit failing to meet a motion requirement.

The embodiments illustrated and described herein as well as embodiments not specifically described herein but within the scope of aspects of the disclosure constitute exemplary means for motion triggered gated imaging. For example, the elements illustrated in FIGS. 1A-1B constitute exemplary means for operating multiple sensor exposure events per a single image frame readout, exemplary means for monitoring motion related to a digital image capture unit, and exemplary means for instructing a gated image sensor to discard a sensor exposure event of the multiple sensor exposure events in response to a temporally corresponding monitored motion related to the digital image capture unit failing to meet a motion requirement.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include mobile telephones (including smart phones), tablet computers and many other devices.

The processes described herein may be performed by software in machine readable form on a tangible storage medium e.g. in the form of a computer program comprising computer program code means adapted to perform all the steps of any of the processes described herein when the program is run on a computer and where the computer program may be embodied on a computer readable medium. Examples of tangible storage media include disks, thumb drives, memory etc. and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims, and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

Aspects of any of the examples described above may be combined with aspects of any of the other examples described to form further examples without losing the effect sought.

The term 'comprising' is used herein to mean including the blocks or elements identified, but that such blocks or elements do not comprise an exclusive list, and a system, a device or an apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. In particular, the individual features, elements, or parts described in the context of one example, may be connected in any combination to any other example also.

The invention claimed is:

1. A digital image capture unit, comprising:
   a gated image sensor configured to operate multiple sensor exposure events that occur during a single image frame readout, the single image frame readout starting with a shutter opening and ending with the shutter closing;
   a motion monitor configured to monitor motion related to the digital image capture unit; and
   a controller configured to instruct the gated image sensor to discard a sensor exposure event of the multiple sensor exposure events in response to a temporally corresponding monitored motion related to the digital image capture unit failing to meet a motion requirement, wherein the sensor exposure event and the temporally corresponding monitored motion occurred at a same time.

2. The digital image capture unit as claimed in claim 1, wherein the motion related to the digital image capture unit comprises motion of an object in a scene to be captured during the image frame readout.

3. The digital image capture unit as claimed in claim 1, wherein the motion related to the digital image capture unit comprises motion of the digital image capture unit.

4. The digital image capture unit as claimed in claim 3, wherein the motion monitor comprises an image stabilizer configured to stabilize image frames by compensating for the monitored motion of the digital image capture unit.

5. The digital image capture unit as claimed in claim 4, wherein the image stabilizer comprises at least one motion sensor configured to detect the motion of the digital image capture unit.

6. The digital image capture unit as claimed in claim 5, wherein at least one motion sensor comprises a gyroscope.

7. The digital image capture unit as claimed in claim 5, further comprising a lens system, wherein the image stabilizer further comprises:
   at least one actuator configured to shift one of the gated image sensor and the lens system in order to compensate for the detected motion of the digital image capture unit; and
   at least one position feedback sensor configured to measure the movement of the shifted one of the gated image sensor and the lens system.

8. The digital image capture unit as claimed in claim 7, wherein at least one position feedback sensor comprises a Hall effect sensor.

9. The digital image capture unit as claimed in claim 7, wherein the motion requirement comprises the difference between the detected motion of the digital image capture unit and the measured movement of the shifted one of the gated image sensor and the lens system staying below a threshold.

10. The digital image capture unit as claimed in claim 9, wherein the threshold is increased over time during the image frame readout.

11. The digital image capture unit as claimed in claim 10, wherein the controller comprises an image stabilizer driver.

12. The digital image capture unit as claimed in claim 1, wherein the gated image sensor is further configured to operate in a global shutter mode.

13. A method, comprising:
    operating, by a gated image sensor of a digital image capture unit, multiple sensor exposure events that occur during a single image frame readout, the single image frame readout starting with a shutter opening and ending with the shutter closing;
    monitoring, by a motion monitor of the digital image capture unit, motion related to the digital image capture unit; and
    instructing, by a controller of the digital image capture unit, the gated image sensor to discard a sensor exposure event of the multiple sensor exposure events in response to a temporally corresponding monitored motion related to the digital image capture unit failing to meet a motion requirement, wherein the sensor exposure event and the temporally corresponding monitored motion occurred at a same time.

14. The method as claimed in claim 13, wherein the motion related to the digital image capture unit comprises motion of an object in a scene to be captured during the image frame readout.

15. The method as claimed in claim 13, wherein the motion related to the digital image capture unit comprises motion of the digital image capture unit, and the method further comprises stabilizing image frames by compensating for the monitored motion of the digital image capture unit.

16. The method as claimed in claim 15, wherein the stabilizing of the image frames comprises detecting, by at least one motion sensor of the digital image capture unit, motion of the digital image capture unit.

17. The method as claimed in claim 16, wherein the stabilizing of the image frames further comprises:
    shifting, by at least one actuator of the digital image capture unit, one of the gated image sensor and a lens system of the digital image capture unit in order to compensate for the detected motion of the digital image capture unit; and
    measuring, by at least one position feedback sensor of the digital image capture unit, the movement of the shifted one of the gated image sensor and the lens system.

18. The method as claimed in claim 17, wherein the motion requirement comprises the difference between the detected motion of the digital image capture unit and the measured movement of the shifted one of the gated image sensor and the lens system staying below a threshold.

19. The method as claimed in claim 18, further comprising increasing the threshold over time during the image frame readout.

20. An electronic apparatus, comprising:
    a digital image capture unit, comprising:
      a gated image sensor configured to operate multiple sensor exposure events that occur during a single image frame readout, the single image frame readout starting with a shutter opening and ending with the shutter closing;

a motion monitor configured to monitor motion related to the digital image capture unit; and a controller configured to instruct the gated image sensor to discard a sensor exposure event of the multiple sensor exposure events in response to a temporally corresponding monitored motion related to the digital image capture unit failing to meet a motion requirement, wherein the sensor exposure event and the temporally corresponding monitored motion occurred at a same time.

* * * * *